US012620893B2

(12) United States Patent
Haederli

(10) Patent No.: US 12,620,893 B2
(45) Date of Patent: May 5, 2026

(54) CONVERTER ARRANGEMENT AND METHOD FOR OPERATING A CONVERTER ARRANGEMENT

(71) Applicant: Hitachi Energy Ltd, Zürich (CH)

(72) Inventor: Christoph Haederli, Zürich (CH)

(73) Assignee: HITACHI ENERGY LTD, Zürich (CH)

( * ) Notice: Subject to any disclaimer, the term of this patent is extended or adjusted under 35 U.S.C. 154(b) by 235 days.

(21) Appl. No.: 18/265,146

(22) PCT Filed: Dec. 3, 2020

(86) PCT No.: PCT/EP2020/084488
§ 371 (c)(1),
(2) Date: Jun. 2, 2023

(87) PCT Pub. No.: WO2022/117195
PCT Pub. Date: Jun. 9, 2022

(65) Prior Publication Data
US 2024/0055979 A1      Feb. 15, 2024

(51) Int. Cl.
*H02M 1/34*        (2007.01)
*H02H 1/00*        (2006.01)
*H02M 1/00*        (2006.01)
(52) U.S. Cl.
CPC .......... *H02M 1/344* (2021.05); *H02H 1/0015* (2013.01); *H02M 1/0003* (2021.05); *H02M 1/0095* (2021.05)
(58) Field of Classification Search
CPC ............. H02M 1/0003; H02M 1/0009; H02M 1/0085; H02M 1/0095; H02M 1/32;
(Continued)

(56) References Cited

U.S. PATENT DOCUMENTS

| | | | |
|---|---|---|---|
| 2007/0052244 A1 | 3/2007 | Hudson |
| 2011/0134574 A1 | 6/2011 | Ritter |
| | (Continued) | | |

FOREIGN PATENT DOCUMENTS

| | | | |
|---|---|---|---|
| CN | 108667390 B | 1/2020 |
| JP | 6371254 B2 | 12/2016 |
| | (Continued) | | |

OTHER PUBLICATIONS

English translation of JP 6371254. (Year: 2018).*
(Continued)

*Primary Examiner* — Thienvu V Tran
*Assistant Examiner* — Carlos O Rivera-Perez
(74) *Attorney, Agent, or Firm* — PROCOPIO, CORY, HARGREAVES & SAVITCH LLP

(57) ABSTRACT

A converter arrangement comprises a converter with a first side and a second side, a first connection line connected to the first side of the converter, a short-circuit switch connected to the first connection line, and a controller having a terminal coupled to the converter and an output connected to a control terminal of the short-circuit switch. A method for operating a converter arrangement comprises providing a detection signal by a converter, receiving the detection signal by a controller, providing a set signal to a short-circuit switch by the controller in case the controller determines a fault of the converter by evaluating the detection signal, and setting the short-circuit switch in a conducting state by the set signal.

19 Claims, 9 Drawing Sheets

Figure 1A:
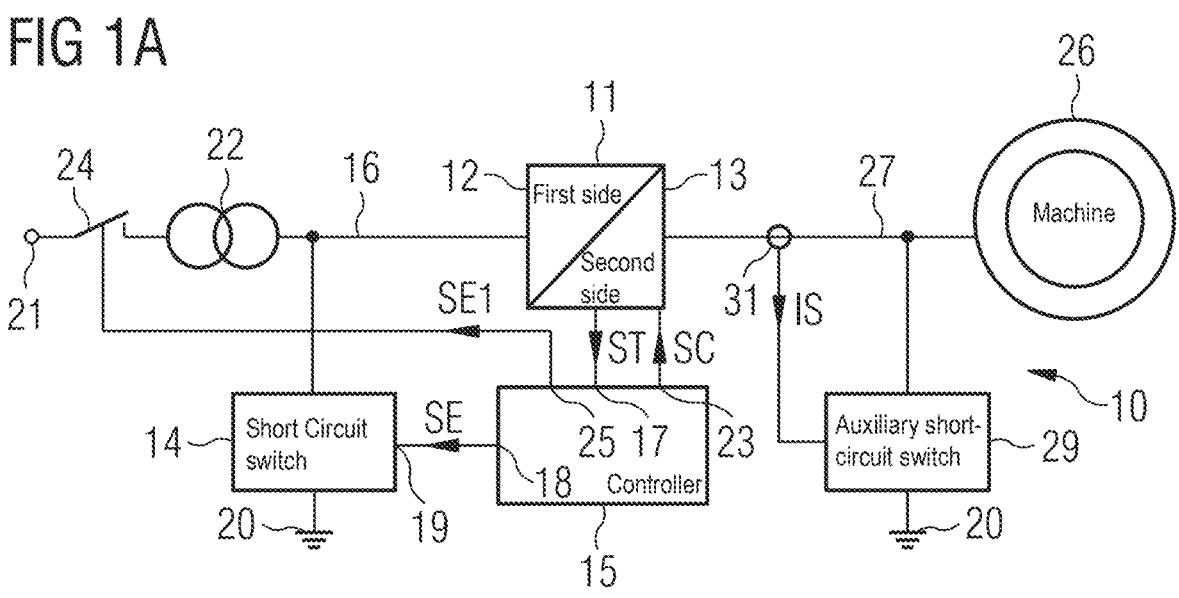

(58) Field of Classification Search
CPC ........ H02M 1/325; H02M 1/34; H02M 1/342;
H02M 1/344; H02M 1/346; H02M 1/348;
H02M 1/36; H02M 5/00; H02M 5/02;
H02M 5/04; H02M 5/22; H02M 5/225;
H02M 5/25; H02M 5/257; H02M 5/2573;
H02M 5/2576; H02M 5/275; H02M
5/293; H02M 5/44; H02M 7/003; H02M
7/44; H02M 7/483–49; H02H 1/00; H02H
1/0007; H02H 1/0015
USPC .... 361/2, 10, 11, 13, 20, 21, 42, 43, 46, 47,
361/49, 50, 51, 54, 55–57, 91.7, 91.8,
361/100, 101, 102; 363/34, 35, 50–58,
363/106, 108, 109; 323/276–278;
290/43, 44
See application file for complete search history.

(56) References Cited

U.S. PATENT DOCUMENTS

| | | | |
|---|---|---|---|
| 2014/0062424 A1 | 3/2014 | Larsen et al. | |
| 2015/0263720 A1 | 9/2015 | Moen et al. | |
| 2016/0276821 A1* | 9/2016 | Politis ...................... | H02H 3/08 |

FOREIGN PATENT DOCUMENTS

| | | |
|---|---|---|
| JP | 2016214030 A | 12/2016 |
| WO | 2017/129252 A1 | 8/2017 |

OTHER PUBLICATIONS

D. Gentsch et al., "New Ultra Fast Earthing Switch (UFES) device based on the vacuum switching principal", IEEE, 2010. (Year: 2010).*

Steimer et al: "Converter-fed synchronous machine for pumped hydro storage plants", 12,14,15 2014 IEEE Energy Conversion Congress and Exposition (ECCE), IEEE, Sep. 14, 2014 (Sep. 14, 2014), pp. 4561-4567, XP032680866, DOI: 10.1109/ECCE.2014.6954025, [retrieved on Nov. 11, 2014] figure 4.

* cited by examiner

CONVERTER ARRANGEMENT AND METHOD FOR OPERATING A CONVERTER ARRANGEMENT

The present disclosure is related to a converter arrangement and a method for operating a converter arrangement.

A converter arrangement comprises a converter having a first and a second side. The first side of the converter is e.g. coupled to a transformer and the second side of the converter is e.g. coupled to a machine such as a motor. A short circuit may occur with a certain probability in such a converter arrangement. Thus, a converter arrangement should be configured such that damage in case of a short circuit is kept small.

Document WO 2017/129252 A1 describes a method and a control device for controlling a modular multilevel converter. The method comprises detecting a fault condition and applying, in response to the detecting, a pulse blocking procedure.

It is an object to provide a converter arrangement and a method for operating a converter arrangement which react in case of a fault of the converter.

The object is achieved by the subject-matter of the independent claims. Further developments are described in the dependent claims.

There is provided a converter arrangement which comprises a converter with a first side and a second side, a first connection line, a short-circuit switch and a controller. The first connection line is connected to the first side of the converter. The short-circuit switch is connected to the first connection line. The controller includes a terminal coupled to the converter and an output connected to a control terminal of the short-circuit switch.

Advantageously, the converter is coupled via the controller to the short-circuit switch. In case of a fault of the converter, the short-circuit switch can reduce a voltage at the first connection line with only a short delay. Thus, measures to reduce a possible effect of the fault are implemented on the first side of the converter.

In a development, the first side of the converter may be a supply side and the second side of the converter may be a load side. Alternatively, the first side of the converter may be a load side and the second side of the converter may be a supply side.

In a development of the converter arrangement, the short-circuit switch is realized as an ultrafast switch. The ultrafast switch may include a micro gas generator. A gas generation by the micro gas generator may set the short-circuit switch in a conducting state with a very short delay.

In a development of the converter arrangement, the short-circuit switch includes a crowbar, e.g. a thyristor crowbar. The crowbar includes at least one thyristor. The crowbar comprises e.g. a thyristor bridge. The short-circuit switch is fabricated using a semiconductor device.

In a development of the converter arrangement, the short-circuit switch connects the first connection line to an earth terminal. In case of a fault, the voltage at the first connection line is quickly reduced to zero.

In a development of the converter arrangement, the short-circuit switch is realized as an ultrafast earthing switch, abbreviated UFES. The ultrafast earthing switch is able to short circuit the first connection line to the earth terminal with an extremely low delay.

In a development, the converter arrangement includes a second connection line connected to the first side of the converter. The short-circuit switch is e.g. coupled to the first connection line and to the second connection line. The short-circuit switch e.g. connects the first connection line to the second connection line. In an example, the short-circuit switch directly connects the first connection line to the second connection line. In case of a fault, the short-circuit switch provides a short circuit between the first and the second connection line. Advantageously, an energy provided to the first side of the converter is quickly reduced by the short circuit between the first and the second connection line. Advantageously, shorting the input line such as the first and the second connection lines prevents further energy input from a grid side into the converter. Moreover, shorting the input side removes the input AC voltage, allowing for a higher output voltage without the converter going into rectification mode (e.g. by free-wheeling diodes in each cell).

In a development, the converter arrangement comprises a third connection line connected to the first side of the converter. The first, second and third connection line form a three phase system.

In a development, the converter arrangement comprises a further short-circuit switch and an additional short-circuit switch. Thus, the converter arrangement comprises three connection lines which are connected to the first side of the converter, namely the first, second and third connection line. The converter arrangement includes three short-circuit switches, namely the short-circuit switch, the further short-circuit switch and the additional short-circuit switch which are arranged at the first, second and third connection line and, thus, at the first side of the converter. The short-circuit switch, the further short-circuit switch and the additional short-circuit switch form a delta configuration or a star configuration. The delta configuration or the star configuration of the short-circuit switch, the further short-circuit switch and the additional short-circuit switch connect the first, the second and the third connection line to each other. Advantageously, in case of a fault of the converter, the short-circuit switch, the further short-circuit switch and the additional short-circuit switch can reduce voltages at the first, second and third connection line with only a short delay.

In a development, the short-circuit switch, the further short-circuit switch and the additional short-circuit switch connect the first, the second and the third connection line to each other via a star node. Thus, the three short-circuit switches form a star configuration. In an example, the star node is coupled to the earth terminal via a star impedance or is directly connected to the earth terminal via a connection line or is free floating.

In a development, the short-circuit switch connects the first connection line to the second connection line. The further short-circuit switch connects the first connection line to the third connection line. The additional short-circuit switch connects the second connection line to the third connection line. Thus, the short-circuit switch, the further short-circuit switch and the additional short-circuit switch form a delta configuration.

In a development of the converter arrangement, the converter is configured to provide a detection signal. The controller is configured to receive the detection signal at the terminal of the controller and to provide a set signal to the control terminal of the short-circuit switch in case a fault is detected by evaluation of the detection signal. Thus, the controller is configured to provide the set signal to the short-circuit switch as a function of the detection signal.

The short-circuit switch is configured to be set in a conducting state by the set signal. A short-circuit is achieved by the detection signal and the set signal in response to a fault of the converter. Thus, the controller is e.g. implemented as a fault-detection unit.

In a development, the converter arrangement comprises a first circuit breaker and a transformer. The first circuit breaker is coupled via the transformer to the first connection line. The controller comprises a further output connected to a control terminal of the first circuit breaker. The controller generates a further set signal at the same time or approximately at the same time at which the set signal is generated. The first circuit breaker is in a conducting state during normal operation of the converter arrangement. The further set signal sets the first circuit breaker in a non-conducting state.

In a development, the converter arrangement comprises a further first connection line connected to the second side of the converter. The converter arrangement includes an auxiliary short-circuit switch connected to the further first connection line. The auxiliary short-circuit switch may connect the further first connection line to the earth terminal.

In a development of the converter arrangement, the controller is coupled to the auxiliary short-circuit switch. The controller provides an additional set signal to the auxiliary short-circuit switch, e.g. in case of a fault of the converter or of a machine. The additional set signal and the set signal may be equal. The additional set signal may be delayed with respect to the set signal. Advantageously, an effect of a short circuit on the second side of the converter is reduced.

In a development, the converter arrangement comprises a current sensor configured to measure a current of the further first connection line. An output of the current sensor is connected to an input of the auxiliary short-circuit switch. The auxiliary short-circuit switch is triggered in case of a current through the further first connection line being higher than a predetermined value.

In a development, the converter arrangement comprises a machine coupled to the second side of the converter via the further first connection line. The machine is implemented e.g. as a motor or generator.

In a further development, the converter arrangement comprises a further second connection line connected to the second side of the converter. The machine may be coupled to the second side of the converter via the further first and the further second connection line.

In a further development, the converter arrangement comprises a further third connection line connected to the second side of the converter. The machine may be coupled to the second side of the converter via the further first, further second and further third connection line.

In a development of the converter arrangement, the converter is implemented as AC/AC converter. The converter may be implemented as direct AC/AC converter or as an AC/DC/AC converter.

Alternatively, the converter may be realized as an AC/DC converter or a DC/AC converter.

In a development of the converter arrangement, the converter may include at least one modular multi-level converter, abbreviated MMC. The multi-level converter includes phase-legs. Each phase-leg comprises a series of cells. A cell may be realized as full-bridge or half-bridge. A phase-leg may be named phaseleg or arm.

In a development of the converter arrangement, the converter is configured to block pulses in case of a fault. Thus, at least one cell of the cells of at least one phase-leg is set in a non-conducting state. The converter provides the detection signal.

There is provided a method for operating a converter arrangement, comprising providing a detection signal by a converter,
receiving the detection signal by a controller,
providing a set signal to a short-circuit switch by the controller in case the controller determines a fault of the converter by evaluating the detection signal, and
setting the short-circuit switch in a conducting state by the set signal.

Advantageously, a short circuit at the first side of the converter is generated by the set signal. Thus, energy provided to the converter is reduced or set to zero for stabilizing the state of the converter.

The converter arrangement is particularly suitable for the method for operating a converter arrangement. Features described in connection with the converter arrangement can therefore be used for the method and vice versa.

In a development of the method, the short-circuit switch connects a first connection line at a first side of the converter to an earth terminal or to a second connection line at the first side of the converter in case the short-circuit switch is set in a conducting state.

In a development of the method, the converter converts a first voltage at a first side of the converter into a second voltage at the second side of the converter.

In a development of the method, the detection signal includes at least one information of a group comprising:
a measurement of a DC voltage of the converter,
a measurement of an AC voltage of the converter,
a measurement of a present voltage across a phase-leg of the converter,
a measurement of a current of the converter,
an information about a status of a cell of the converter,
an information about a status of a phase-leg of the converter, and
an information about a detected light generated by an arc.

In a development of the method, the detection signal includes at least one information of a subset of the above mentioned group or several information of a subset of the above mentioned group.

Advantageously, one information or signal or several information or signals are included in the detection signal and provided to the controller.

In a development of the method, the controller determines a fault of the converter by performing at least one evaluation of a group comprising:
comparing the DC voltage of the converter with the AC voltage of the converter,
comparing a maximum available phase-leg voltage with the present voltage across a phase-leg of the converter,
comparing the current of the converter with a predetermined value,
comparing a number of cells of the converter with a status indicating a short-circuit with a predetermined number,
determining a presence of a phase-leg of the converter with a status indicating out-of-order, and
determining a presence of an arc.

In a development of the method, the controller determines a fault of the converter by performing at least one evaluation of a subset of the above mentioned group or several evaluations of a subset of the above mentioned group.

Advantageously, the set signal (and optionally also a further set signal) are generated by the controller depending on at least one evaluation.

In an example, the converter includes phase-legs. The DC voltage of the converter is the maximum voltage of a phase-leg of the converter or of the phase-legs of the converter and may be named maximum available phase-leg voltage. The AC voltages of the converter are external AC voltages provided to the converter, e.g. to the first side of the converter, to the second side of the converter or both. The externally imposed AC voltages (e.g. three AC voltages at the input side and three AC voltages at the output side) lead to a minimum phase-leg voltage requirement in order to avoid rectification by the converter (in which case the converter would draw uncontrolled currents from the AC networks and charge the DC voltages beyond their target setpoint). The minimum phase-leg voltage requirement can be obtained by calculation from the AC voltages assuming a suitable common mode voltage between the two AC sides. In case the DC voltage of the converter is less than the minimum phase-leg voltage requirement, the controller provides the set signal (that means a fault has occurred or may occur). In case the maximum available phase-leg voltage is less than the minimum phase-leg voltage requirement, the converter is no longer able to operate.

In an example, each phase-leg of the converter can be considered as a voltage source which can generate a maximum available phase-leg voltage (which can be named DC voltage of the converter). The voltages at the first side and the second side of the converter result in a present voltage that is tapped between the two ends of a phase-leg of the converter. For operation of the converter, the present voltage has to be less than the maximum available phase-leg voltage. In case the maximum available phase-leg voltage is higher than the present voltage across a phase-leg, the controller does not provide the set signal (that means no fault has occurred or may occur). In case the maximum available phase-leg voltage is less than the present voltage across a phase-leg, the converter provides the set signal. The value of the maximum available phase-leg voltage is stored e.g. in the controller or the converter and is e.g. constant. A value of the present voltage is measured and provided e.g. to the controller. This comparison is performed for each phase-leg of the converter.

In an example, the current of the converter is an AC current. In case the current of the converter DC is higher than a predetermined value (e.g. an overcurrent limit), the controller provides the set signal (that means a fault has occurred or may occur).

In an example, in case the number of cells of the converter with a status indicating a short-circuit is higher than a predetermined number, the controller provides the set signal (that means a fault has occurred or may occur). The predetermined number may be zero, one or higher than one. In an example, the converter may operate even with a small number of short-circuited cells.

In an example, in case the presence of a phase-leg of the converter with a status indicating out-of-order is determined by the controller, the controller provides the set signal (that means a fault has occurred).

In an example, in case the presence of an arc is determined, the controller provides the set signal (that means a fault has occurred). The detected arc is inside the converter arrangement. The arc is e.g. inside the converter and/or at the transformer.

In a development, the converter arrangement implements a fault detection functionality. The fault detection functionality can be realized in a separate physical unit (e.g. a controller or using a bus or a protection relay for a UFES). The fault detection functionality could also be integrated into a control unit controlling the converter or located in the housing of the converter. In an example, in the case of a thyristor crowbar, detection and generation of the set signal could all be integrated into the controller that realizes a converter main controller. Alternatively, the controller detects a fault independently with its own set of sensors (without getting a detection signal, a fault signal or other signal from the control unit that controls the converter). The controller realizes a fault-detection unit. The set signal may be named firing signal.

In a development, the fault detection functionality and the function of controlling the controller are realized by two devices or arrangements namely by the controller and the control unit or by one device or arrangement namely the controller.

In a development, the converter arrangement is configured for machine side short-circuit prevention in MMC operated machine system by an UFES and its suitable control. There can always be short circuits in MMC operated machine systems, either by the converter itself, on its terminals or on transformer or machine. An unfavorable feature of any full scale converter synchronous machine application and notably variable speed generator application is that a machine short circuit current cannot easily be stopped (interrupted). It will continue flowing until the source is gone (machine stopped, machine de-excited). Thus, a system either relies on removing the source and/or shorting the source by fast short circuit devices (earth switches with making capability or UFES), in order to commutate the fault current away from where it can create damage.

Advantageously, the converter arrangement aims at avoiding shorting the machine terminals at least in some fault scenarios.

In a development, an MMC of a direct AC/AC converter has the inherent feature that its phase legs voltage blocking capability is able to cover the sum of both AC voltages. This means the blocking capability of the converter has large reserves comparing with one AC voltage alone. This feature can be used for the protection concept as proposed in this disclosure.

In an example, upon a failure within the converter, the converter may not have sufficient blocking capability for both AC voltages applied. As a consequence, the first failure may lead to subsequent failures due to the feeding AC source.

In a development, the converter arrangement is configured to implement at least one of the features:

Upon the detection of a converter internal fault, there is a fast shorting of the transformer side AC terminals and converter pulses are blocked at the same time.

In many cases, this will drive all currents to zero and the full remaining converter blocking voltage will be available for the machine side (as the grid side is shorted). Machine side currents will decay and no short circuit on the machine will be generated.

On the down side, the short circuit introduced on the transformer side leads to a short circuit of the grid. However, the short circuit currents are limited by the transformers short circuit impedance and the duration is limited by the protection system, which will trip the main circuit breaker on the grid side.

The protection scheme proposed thus shifts the problem to the side where is can be solved better, while keeping the other side alive.

The concept may not work e.g. for all potential faults, but at least some kind of faults can be handled in a safer way than without the proposed protection concept.

The concept can be combined with other mitigation means. For example: React fast with a grid side UFES and main circuit breaker tripping. If all currents decay, no further action is required.

If there remains a sustained machine side short circuit after this protective action, a delayed protection function can act on short circuit devices on the machine side, e.g. using an auxiliary short-circuit switch (which may be named machine side UFES).

In an example, the protective functions can be combined. The machine side UFES can be triggered from the controller or a current sensor or from each of them.

The converter arrangement may be particularly realized in variable speed hydro generation or pumped storage applications or a hydro pumped storage arrangement.

The following description of figures of examples or embodiments may further illustrate and explain aspects of the converter and the method for operating a converter. Arrangements, switches, devices and units with the same structure and the same effect, respectively, appear with equivalent reference symbols. In so far as arrangements, switches, devices and units correspond to one another in terms of their function in different figures, the description thereof is not repeated for each of the following figures.

FIGS. 1A to 1C, 2, 3 and 4A to 4C show exemplary embodiments of a converter arrangement, FIGS. 5A, 5B, 6A and 6B show exemplary characteristics of signals of a converter arrangement; and FIGS. 7A, 7B, 8A to 8D and 9A to 9C show exemplary embodiments of details of a converter arrangement.

FIG. 1A shows an exemplary embodiment of a converter arrangement 10 comprising a converter 11 having a first and a second side 12, 13. Moreover, the converter arrangement 10 comprises a short-circuit switch 14 and a controller 15. The converter arrangement 10 comprises a first connection line 16 connected to the first side 12 of the converter 11. The short-circuit switch 14 is connected to the first connection line 16. The controller 15 has a terminal 17 connected to a terminal of the converter 11. The terminal 17 may be an input, an input/output or a bus terminal. An output 18 of the controller 15 is connected to a control terminal 19 of the short-circuit switch 14. The short-circuit switch 14 is additionally connected to an earth terminal 20. The controller 15 includes e.g. a microprocessor, microcontroller, computer and/or computer system. A further output 23 of the controller 15 is e.g. connected to the converter 11.

The converter arrangement 10 comprises a transformer 22 that is coupled to the first side 12 of the converter 11. The first connection line 16 connects the transformer 22 to the first side 12 of the converter 11. Additionally, the converter arrangement 10 comprises a first circuit breaker 24. A terminal of the first circuit breaker 24 is connected to the transformer 22. Thus, the first circuit breaker 24 is coupled via the transformer 22 to the first connection line 16. A further terminal of the first circuit breaker 24 is coupled to a grid 21. A further output 25 of the controller is connected to a control terminal of the first circuit breaker 24. Thus, the first side 12 of the converter 11 is e.g. a grid side or supply side. The second side 13 of the converter 11 is e.g. a load side, machine side or motor side.

Additionally, the converter arrangement 10 comprises a machine 26 coupled to the second side 13 of the converter 11. The machine 26 is e.g. a motor or generator. The converter arrangement 10 includes a further first connection line 27 connected to the second side 13 of the converter 11 and to the machine 26. The converter arrangement 10 comprises an auxiliary short-circuit switch 29 connected to the further first connection line 27. The converter arrangement 10 comprises a current sensor 31 that is coupled to the further first connection line 27. An output of the current sensor 31 is connected to an input of the auxiliary short-circuit switch 29. The auxiliary short-circuit switch 29 is also connected to the earth terminal 20. The current sensor 31 is connected to the further first connection line 27 between the second side 13 of the converter 11 and a node of the further first connection line 27 to which the auxiliary short-circuit switch 29 is connected.

The converter 11 generates a detection signal ST. The detection signal ST is provided to the controller 15. The controller 15 generates a set signal SE as a function of the detection signal ST. The set signal SE is provided to the short-circuit switch 14 by the controller 15. The controller 15 evaluates the detection signal ST and generates the set signal SE with a first value in case of a fault of the converter 11 and with a second value in case of an absence of a fault of the converter 11.

In an example, the detection signal ST includes several signals. The controller 11 evaluates the several signals included by the detection signal ST and generates the set signal SE as a function of the several signals included by the detection signal ST.

The set signal SE sets the short-circuit switch 14 in a conducting state in case of the set signal SE having the first value that means in case of a fault of the converter 11. Thus, the short-circuit switch 14 directly connects the first connection line 16 to the earth terminal 20. Thus, the first connection line 16 at the first side 12 of the converter 11 is short circuited to the earth terminal 20 in case the set signal SE has the first value. Thus, the first side 12 of the converter 11 or at least a terminal at the first side 12 of the converter 11 is short circuited to the earth terminal 20.

Simultaneously, in case the set signal SE has the first value, the controller 15 provides a further set signal SE1 to the first circuit breaker 24 that sets the first circuit breaker 24 in a non-conducting state. Due to the different time characteristics of the first circuit breaker 24 and the short-circuit switch 14, short circuiting of the first connection line 16 can be achieved faster than opening of the first circuit breaker 24. Advantageously, by short circuiting the first connection line 16 to the earth terminal 20, effects of the fault inside the converter 11 to the second side 13 of the converter 11 and also to the machine 26 can be reduced or avoided.

The current sensor 31 provides a current sensor signal IS to the auxiliary short-circuit switch 29. The auxiliary short-circuit switch 29 is triggered in case of a current through the further first connection line 27 being higher than a predetermined value. In this case, the auxiliary short-circuit switch 29 short circuits the further first connection line 27 to the earth terminal 20.

Figure 9A:
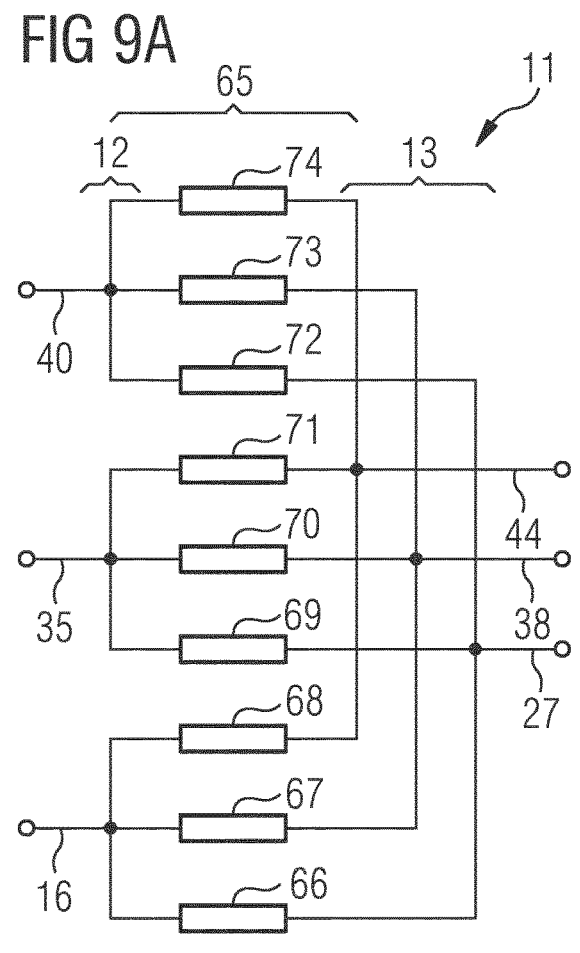

The controller 15 generates control signals SC. The control signals SC are applied via the further output 23 of the controller 15 to the converter 11. The control signals SC include several signals. The control signals SC are used to control the converter 11, for example the different phase-legs of the modular multi-level converter as shown in FIG. 9A. The controller 15 generates the control signals SC using the detection signal ST.

The detection signal ST is generated by the converter 11. The controller 15 detects a fault by analyzing internal voltages and/or currents of the converter 11. Thus, the controller 15 may combine different signals such as signals representing voltages or currents inside the converter 11 to generate the set signal SE. The set signal SE receives the first value e.g. upon a phase leg failure (e.g. in case a complete phase leg is shorted, not just a cell).

In the case of a fault, the grid side AC terminals of the converter 11 shall be shorted by a very fast shorting device realized by the short-circuit switch 14 (for example, but not limited to an UFES). Such a short circuit immediately draws the full grid side short-circuit current, but at the same time it also leads to an immediate pulse blocking of the converter 11 and the full converter blocking voltage to be available on the machine side. This will avoid generating a short circuit on the machine 26, such as a motor.

The short-circuit switch 14 is realized e.g. as grid side UFES. Advantageously, acting on the grid side achieves protection on the machine side. The same effect could be achieved by disconnecting the grid side. However, opening the grid circuit breaker 24 is relatively slow and may take several fundamental cycles. The solution with the UFES is much faster in comparison (e.g. creating a short in typically less than 4 ms). As soon as the short circuit is established, the full blocking voltage is available on the machine side.

In FIG. 1A, the converter arrangement 10 includes UFES 14, 29 on both grid side and machine side of the converter 11.

Alternatively, the converter arrangement 10 is free of the auxiliary short-circuit switch 29.

In an alternative embodiment, not shown, the controller 15 is free of the further output 23. The terminal 17 of the controller 15 additionally takes over the function of the further output 23. The converter 11 is coupled to the controller 15 by a bus connection, e.g. a bidirectional bus connection. The detection signal ST and the control signals SC are communicated between the converter 11 and the controller 15 via the bus connection, connected to the terminal 17 of the controller 15.

In an alternative embodiment, not shown, the output 18 of the controller 15 is realized as a bus terminal that is connected to the control terminal 19 of the short-circuit switch 14 and to the control terminal of the first circuit breaker 24 via a bus line. Thus, the further output 25 may be omitted.

In an alternative embodiment, not shown, the current sensor 31 is connected to the further first connection line 27 between the machine 26 and the node of the further first connection line 27 to which the auxiliary short-circuit switch 29 is connected.

Figure 1B:
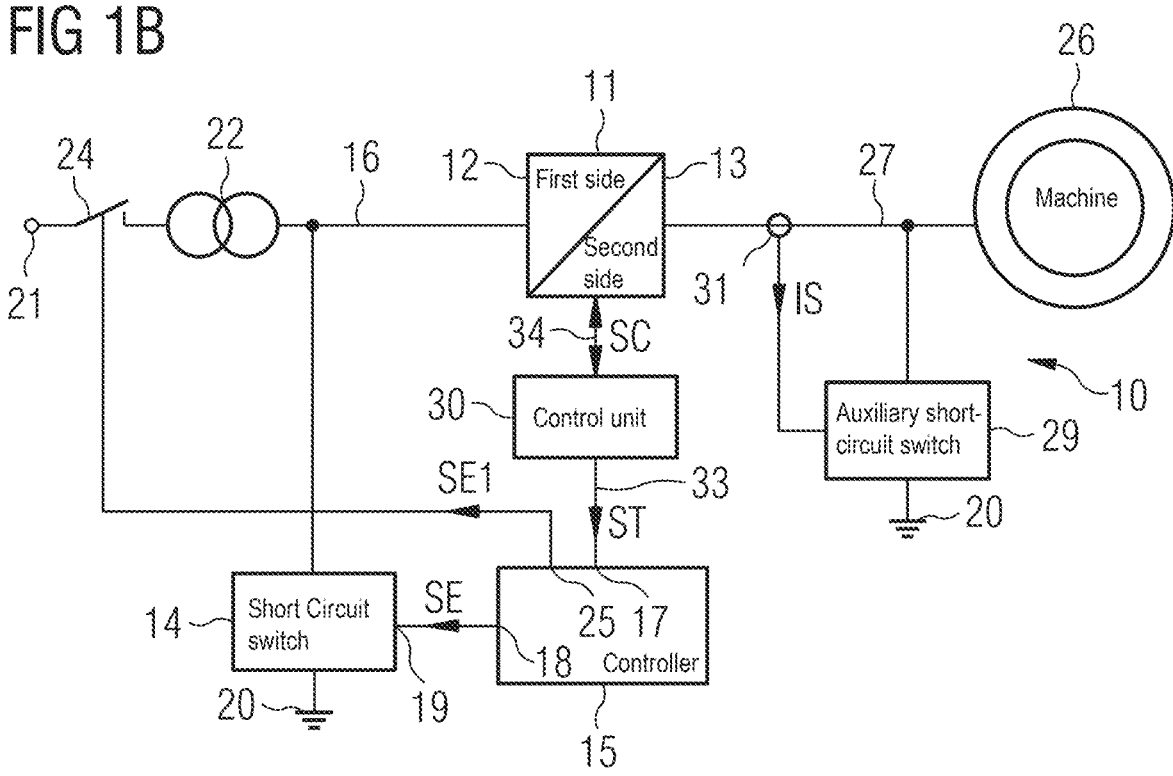

FIG. 1B shows a further exemplary embodiment of a converter arrangement 10 which is a further development of the embodiment shown in FIG. 1A. The converter arrangement 10 comprises a control unit 30 which is connected to the controller 15 via a connection line 33 that is e.g. realized as a bus line. The control unit 30 is connected to the converter 11 via a further connection line 34 that is e.g. realized as a bus line. The control unit 30 controls the converter 11. The control unit 30 generates the control signals SC. The control unit 30 receives information from the converter 11. Using this information, the control unit 30 generates the detection signal ST. The control unit 30 provides the detection signal ST to the controller 15.

Figure 1C:
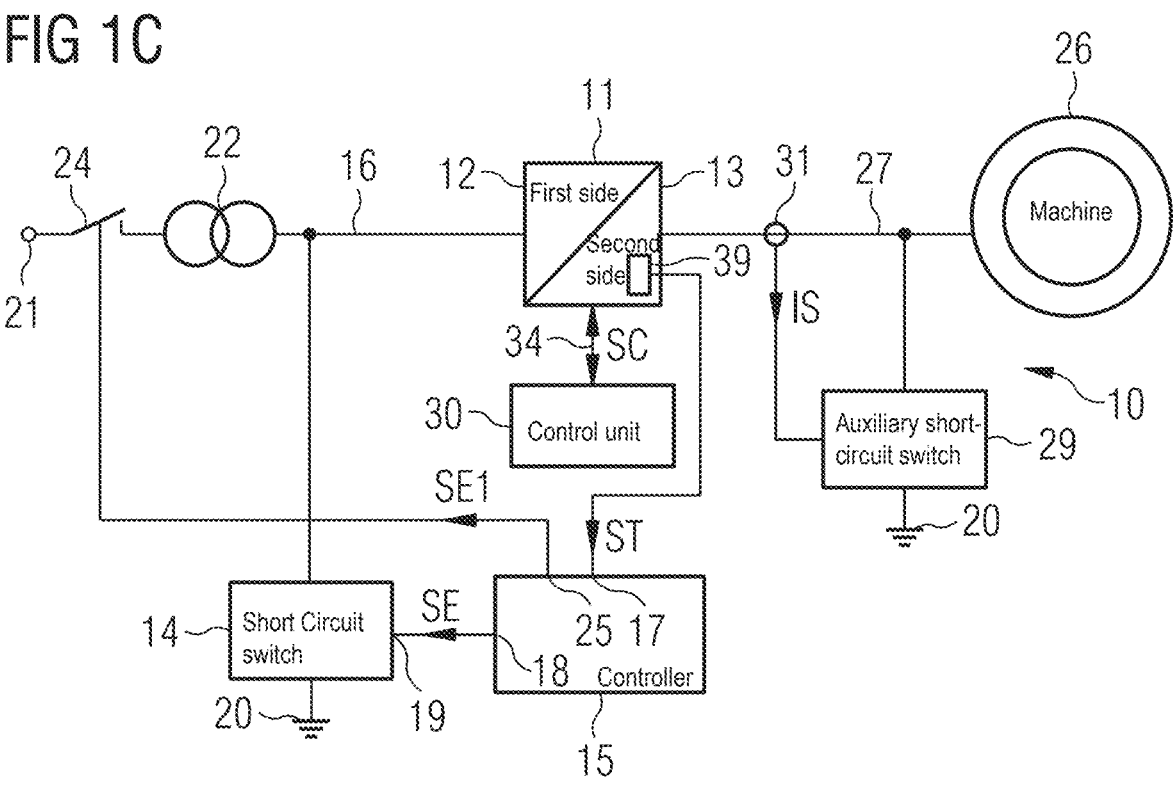

FIG. 1C shows a further exemplary embodiment of a converter arrangement 10 which is a further development of the embodiments shown in FIGS. 1A and 1b. The converter arrangement 10 comprises the control unit 30 which is connected to the converter 11. The controller 15 is e.g. free from a connection to the control unit 30. The converter 11 comprises at least a sensor 39. The converter 11 comprises e.g. sensors and/or detectors for detecting currents, voltages and/or light generated by arcs.

The control unit 30 controls the converter 11. The control unit 30 generates the control signals SC. The control unit 30 receives information from the converter 11. The controller 15 receives the detection signal ST directly from the converter 11.

Advantageously, the normal control tasks for controlling the converter 11 and the fault detection are realized by two independent units or arrangements, namely the controller 15 and the control unit 30.

In an alternative embodiment, not shown, the controller 15 receives the detection signal ST from the control unit 30 (as shown in FIG. 1B) and a further detection signal directly from the converter 11 (as shown in FIG. 1C). Thus, the controller 15 receives some information which is present or is generated by the control unit 30 (e.g. information about voltages, currents and/or cell status) and other information from the sensor 39 and/or a detector of the converter 11 (e.g. information about an arc by a light sensor). The detection signal ST e.g. includes several signals. The further detection signal e.g. includes several signals.

Figure 2:
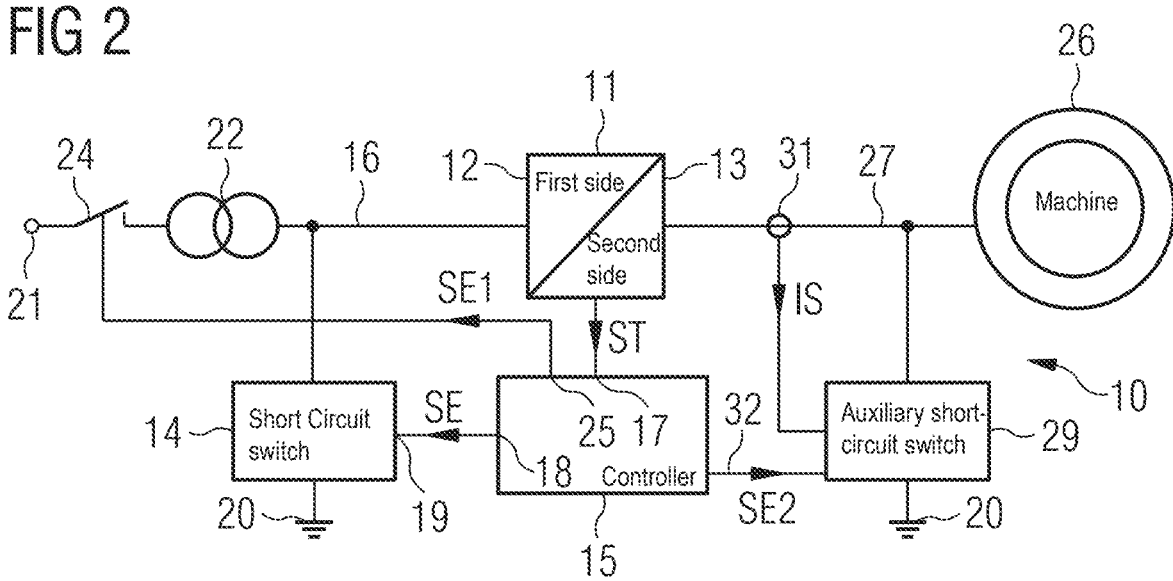

FIG. 2 shows a further exemplary embodiment of a converter arrangement 10 which is a further development of the embodiment shown in FIGS. 1A to 1C. The controller 15 is connected via a bus line or a connection line 32 to the auxiliary short-circuit switch 29. Thus, in case of a fault of the converter 11 an additional set signal SE2 can be generated in addition to the set signal SE. The additional set signal SE2 can also be set in case of a fault of the converter 11, for example at the same time or an earlier time or a later time than the set signal SE. Additionally, the auxiliary short-circuit switch 29 may also provide information to the controller 15 via the connection line or bus line 32.

In an alternative, not shown embodiment, the current sensor 31 is connected to the controller 15. Thus, the current sensor 31 is not connected to the auxiliary short-circuit switch 29.

Figures 3, 4A:
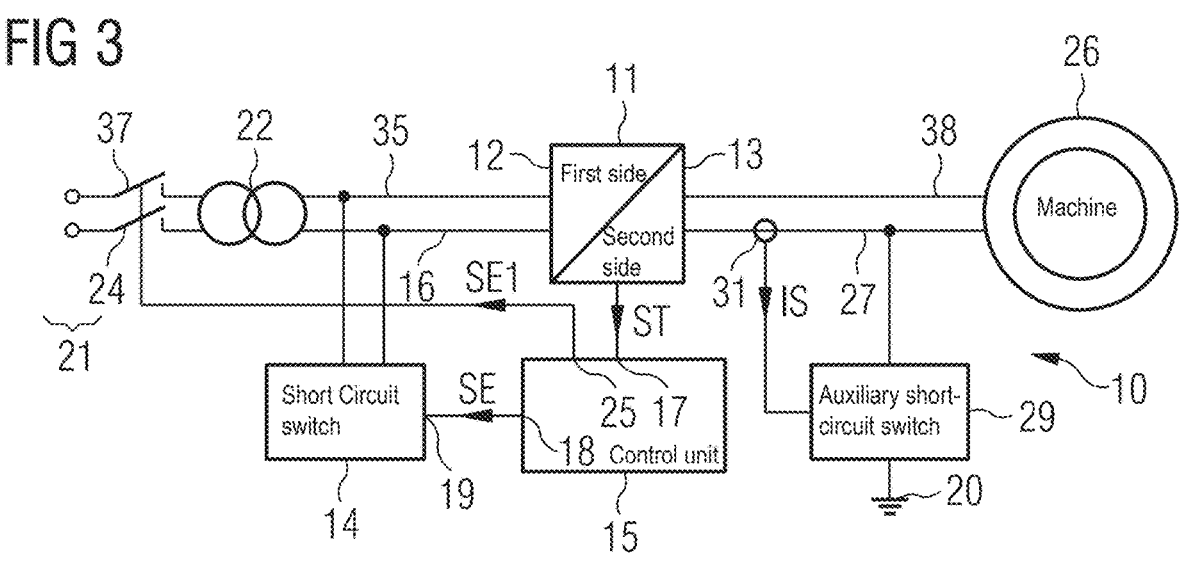

FIG. 3 shows a further exemplary embodiment of the converter arrangement 10 which is a further development of the embodiments shown in FIGS. 1A, 1B, 1C and 2. The converter arrangement 10 comprises a second connection line that is connected to the first side 12 of the converter 11. The short-circuit switch 14 is connected to the first and the second connection line 16, 35. Thus, the short-circuit switch 14 short circuits the first connection line 16 to the second connection line 35 after receiving the set signal SE in case of a fault of the converter 11. The converter arrangement 10 comprises a second circuit breaker 37 that is coupled via the transformer 22 to the second connection line 35. The further output 25 of the controller 15 is connected to a control terminal of the second circuit breaker 37. The converter arrangement 10 comprises a further second connection line 38, coupling the second side 13 of the converter 11 to the machine 26.

Thus, the detection signal ST is provided from the converter 11 to the controller 15. In case of a fault in the converter 11, the controller 15 generates the set signal SE. Thus, the first connection line 16 is short circuited to the second connection line 35. The first connection line 16 is not short circuited to the earth terminal 20 as shown in FIGS. 1A to 1C and 2. The further set signal SE1 sets both the first and the second circuit breaker 24, 37 in a non-conducting state.

In an alternative, not shown embodiment, the converter arrangement 10 comprises a second short-circuit switch connected to the further second connection line 38 and to the earth terminal 20. The converter arrangement 10 comprises a second current sensor that is coupled to the further second connection line 38 and to the second short-circuit switch.

In an alternative, not shown embodiment, the short-circuit switch 14 couples the first connection line 16 to the earth terminal 20 (as shown in FIGS. 1A and 1B). The converter arrangement 10 comprises a further short-circuit switch that couples the second connection line 35 to the earth terminal 20.

FIG. 4A shows an alternative embodiment of the converter arrangement 10 which is a further development of the embodiments shown in FIGS. 1A, 1B, 1C, 2 and 3. The converter arrangement 10 comprises a third connection line 40 that is connected to the first side 12 of the converter 11. The first, second and third connection line 16, 35, 40 form a three-phase system. The transformer 22 is coupled via the third connection line 40 to the converter 11. Moreover, the converter arrangement 10 comprises a further short-circuit switch 41 coupling the first connection line 16 to the third connection line 40. Furthermore, the converter arrangement 10 comprises an additional short-circuit switch 42 coupling the second connection line 35 to the third connection line 40. Thus, the short-circuit switch 14, the further short-circuit switch 41 and the additional short-circuit switch 42 form a delta configuration or delta connection. The delta configuration is also indicated in the lower part of FIG. 4A. The three short-circuit switches 14, 41, 42 are directly connected between the three phases. The set signal SE is applied to the control terminal of each of the short-circuit switch 14, the further short-circuit switch 41 and the additional short-circuit switch 42.

The converter arrangement 10 additionally comprises a third circuit breaker 43 that is connected to the transformer 22 and to the grid 21. Thus, the third circuit breaker 43 is coupled via the transformer 22 to the third connection line 40. The further output 25 of the controller 15 is connected to a control terminal of the third circuit breaker 43. The second and the third circuit breaker 37, 43 are realized in the same manner as the first circuit breaker 24. Additionally, the converter arrangement 10 comprises a further third connection line 44 coupling the second side 13 of the converter 11 to the machine 26.

In an alternative, not shown embodiment, the converter arrangement 10 comprises a third short-circuit switch connected to the further third connection line 44 and to the earth terminal 20. The converter arrangement 10 comprises a third current sensor that is coupled to the further third connection line 44 and to the third short-circuit switch.

Figure 4B:
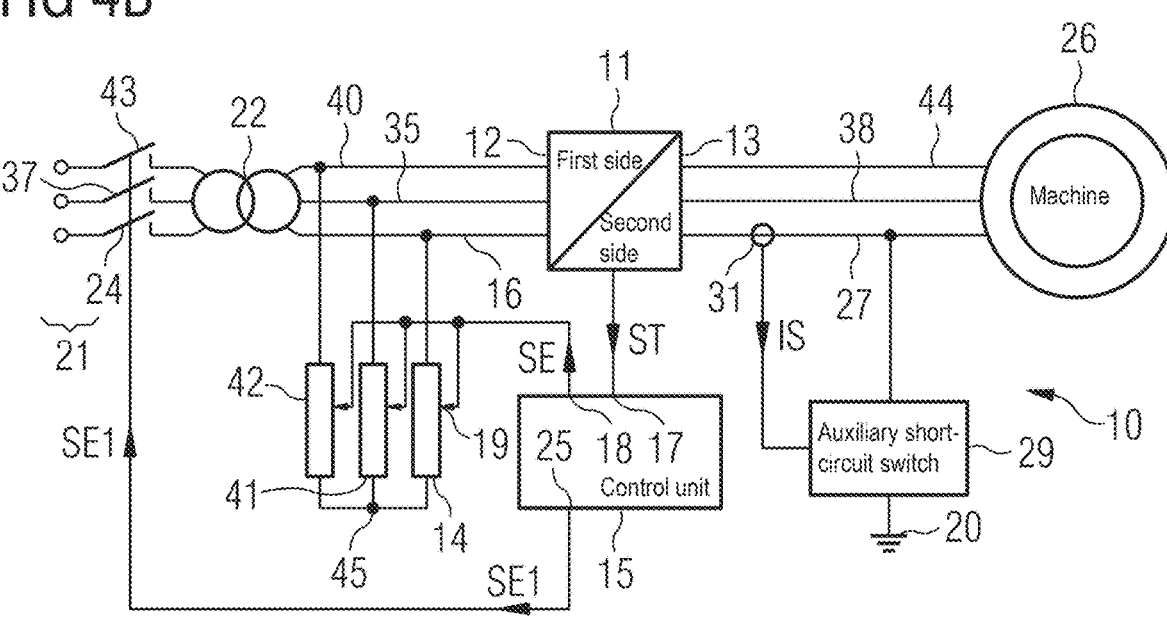

FIG. 4B shows an alternative embodiment of the converter arrangement 10 which is a further development of the embodiments shown in FIGS. 1A to 1C, 2, 3 and 4A. The converter arrangement 10 includes a star node 45. The short-circuit switch 14 couples the first connection line 16 to the star node 45. The further short-circuit switch 41 couples the second connection line 35 to the star node 45. The additional short-circuit switch 42 couples the third connection line 40 to the star node 45. The star node 45 is a floating node. The star node 45 is isolated e.g. to the earth terminal 20. The star node 45 is free from any connection to the earth terminal 20 or to another reference potential terminal. Thus, the short-circuit switch 14, the further short-circuit switch 41 and the additional short-circuit switch 42 form a star configuration or star connection which can also be named Wye configuration or Wye connection. The set signal SE is applied to the control terminal of each of the short-circuit switch 14, the further short-circuit switch 41 and the additional short-circuit switch 42. Thus, the three phases are switched to the common star node 45 by the three short-circuit switches 14, 41, 42 in case of a fault.

Figure 4C:
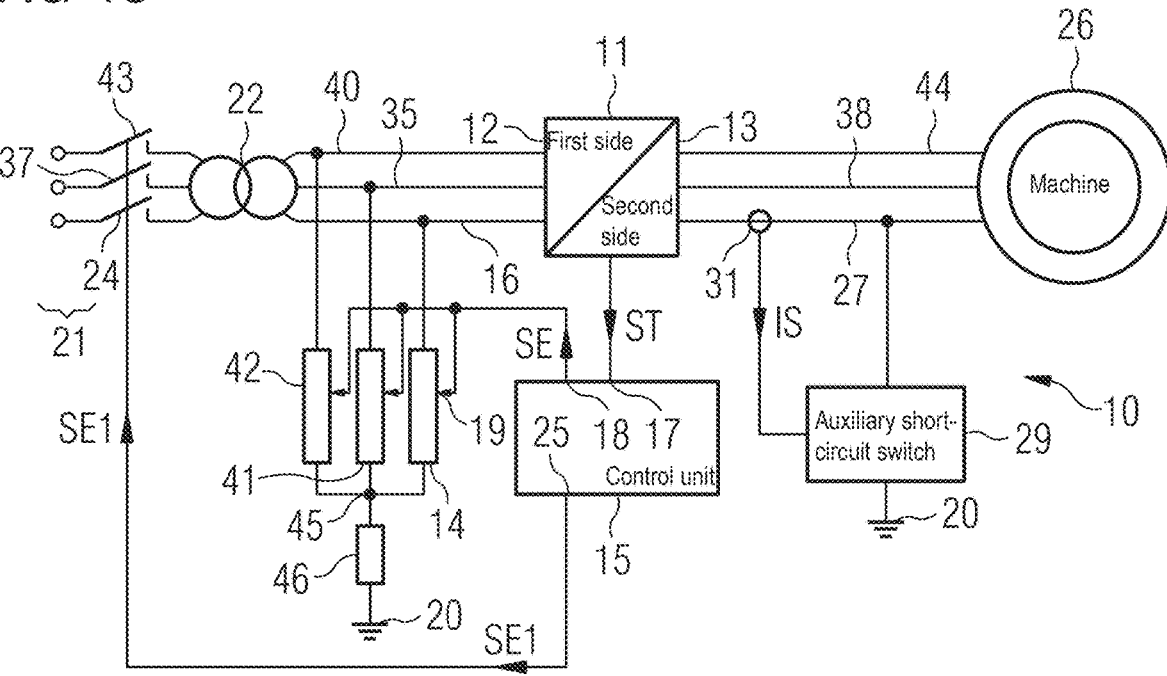

FIG. 4C shows an alternative embodiment of the converter arrangement 10 which is a further development of the embodiments shown in FIGS. 1A to 1C, 2, 3, 4A and 4B. The converter arrangement 10 includes a star impedance 46.

The star impedance 46 couples the star node 45 to the earth terminal 20. The star impedance 46 is e.g. realized as a resistor. The star node 45 is tied to the earth terminal 20.

In an alternative embodiment, not shown, the star node 45 is connected to the earth terminal 20 via a connection line. Thus, the star impedance 46 has an impedance value of zero Ohm or nearly zero Ohm. The star node 45 is not floating. The star node 45 has the potential of the earth terminal 20. The short-circuit switch 14, the further short-circuit switch 41 and the additional short-circuit switch 42 conductively connect the first, second and third connection line 16, 35, to the earth terminal 20 in case of a fault of the converter 11. Thus, in case of a fault of the converter 11, the first, second and third connection line 16, 35, 40 are short-circuited to the earth terminal 20 by the set signal SE.

Thus, in an example, the short-circuit switches 14, 41, 42 are wired in star-form: The three phases are connected to the common star node 45. The star node 45 can be called star point. The star node 45 in turn can be connected to earth or can be isolated. The delta connection is also possible (the three short-circuit switches 14, 41, 42 are directly arranged between the phases), as shown in FIG. 4A. The converter arrangement 10 can be realized as a 3-phase variant with the three short-circuit switches 14, 41, 42 in star arrangement or as a 3-phase variant with the three short-circuit switches 14, 41, 42 in delta arrangement.

The features shown in FIGS. 1A, 1B and 1C can be combined with the features shown in FIGS. 2, 3 and 4A to 4C.

The functionality of a fault detection unit can be implemented by one device such as the controller 15 or by several devices (e.g. including the controller 15, the control unit 30 and/or sensors and/or detectors inside the converter 11) that are located at different locations and exchange signals. A detection of a fault condition can either be (not limited to) achieved by:

voltage measurements (DC and/or AC voltage),
  current measurements,
  status feedback of cells/phase-legs (including but not
    limited to cell functionality [in operation/shorted]) and/
    or
  arc detection (light detection).

Some of the signals or information is e.g. processed and/or generated in the converter 11 (e.g. the cell status), other signals or information is e.g. processed in an external unit (arc detection).

The actual criteria for detection of a fault may be for example:

just a comparison of sum of cell voltages and AC volt-
    ages,
  just based on information of shorted cells,
  a combination of the above,
  a further combination with AC current measurements
    and/or
  AC current measurements alone.

The criteria for detection of a fault e.g. use the cell status and a maximum available phase leg voltage. This maximum available phase leg voltage is compared with the present minimum phase-leg voltage required (imposed by the external AC voltages) to identify a critical situation and generate the set signal SE. The set signal SE can be named fault signal. Some functionality may be integrated in the converter 11, some may be integrated in an external device such as the controller 15.

The following FIGS. 5A, 5B, 6A and 6B show simulations of examples of a converter arrangement 10 with and without UFES application.

Figure 5A:
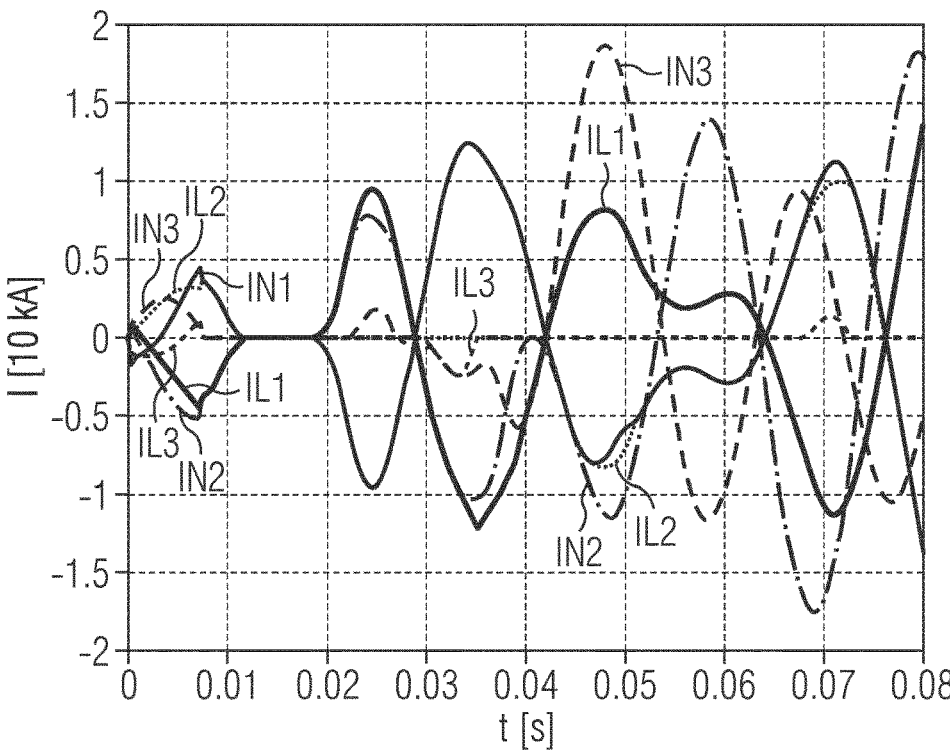
Figure 5B:
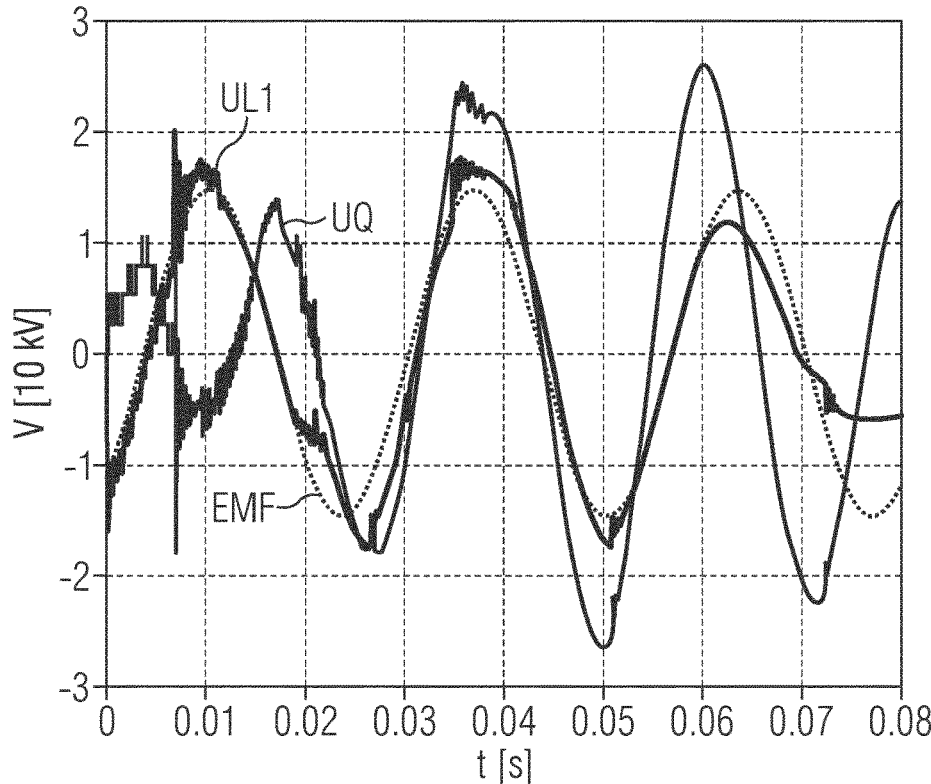

FIGS. 5A and 5B show examples of signals at a converter arrangement 10 as a function of a time t as discussed above without the short-circuit switch 14. In FIG. 5A, currents are shown, whereas in FIG. 5B voltages of the converter arrangement 10 are shown. In FIG. 5A, grid currents IN1, IN2, IN3 and machine currents IL1, IL2, IL3 without UFES in sample case are illustrated. In details, the symbols have the following meaning:

IN1: grid current of the first connection line 16;

IN2: grid current of the second connection line 35;

IN3: grid current of the third connection line 40;

IL1: load current of the further first connection line 27;

IL2: load current of the further second connection line 38;

IL3: load current of the further third connection line 44.

In FIG. 5B, the following voltages are illustrated:

UQ: source voltage;

UL1: load voltage;

EMF: electro-magnetic force of the machine 26.

In FIGS. 5A and 5B, voltage and current waveforms in case of a converter phase leg short circuit is shown. This may be named a "bad case". Behavior can be very different depending on operating point of grid, converter and machine. The fault in the converter 11 occurs at the point of time 0.00 s. A blocking of the converter 11 results in a reduction of the currents between 0.00 s and 0.01 s. However, since the source voltage UQ and the electro-magnetic force EMV of the machine 26 are still present, cells of phase-legs of the converter 11 start conducting again resulting in an increase of currents after 0.02 s.

Figure 6A:
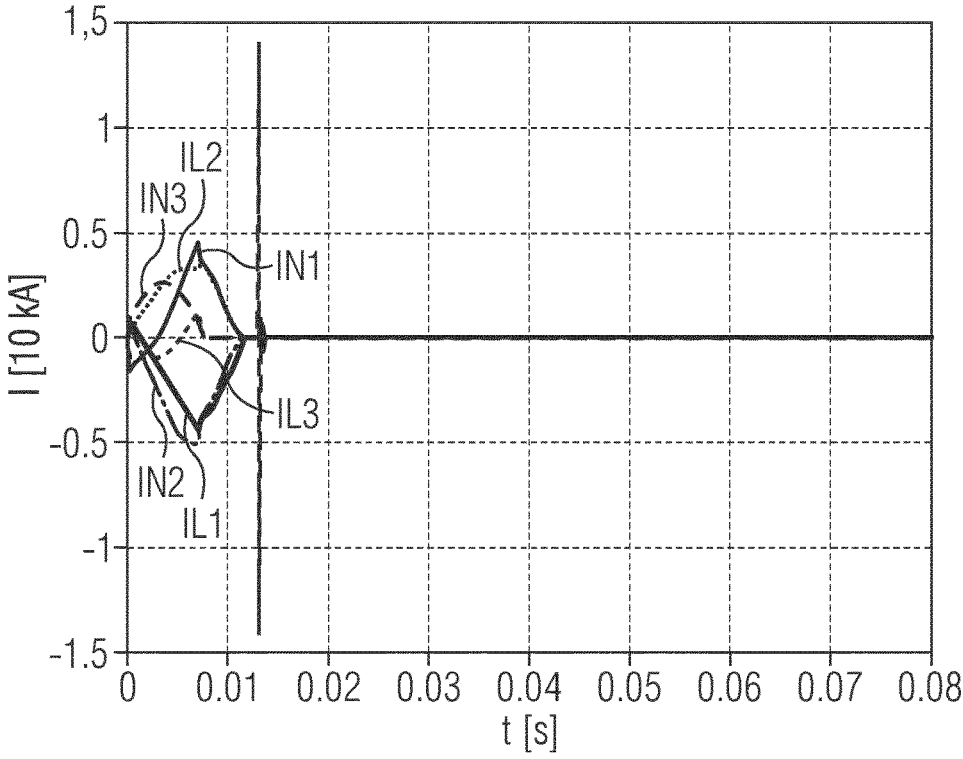
Figure 6B:
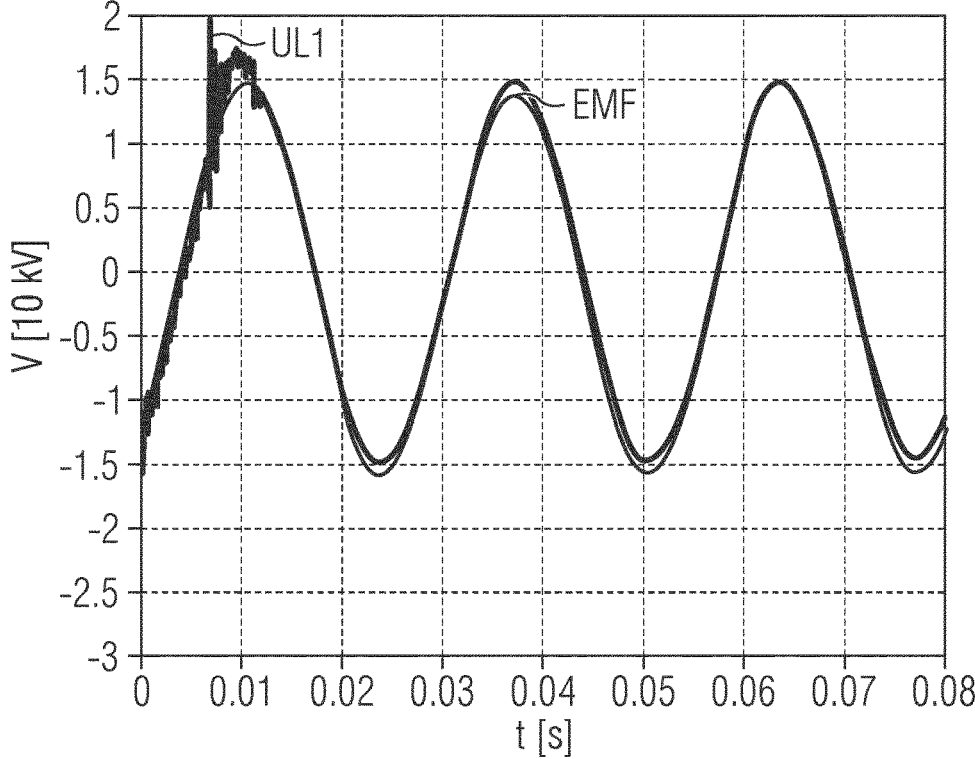

FIGS. 6A and 6B show examples of characteristics of an arrangement 10 as shown by FIG. 1A. The symbol for the grid currents IN1, IN2, IN3, the machine currents IL1, IL2, IL3 and the voltages UL1, EMV have the same meaning as in FIGS. 5A and 5B. In FIGS. 6A and 6B voltage and current waveforms in case of converter phase leg short circuit are depicted (same pre-conditions as in FIGS. 5A and 5B). The fault in the converter 11 occurs at the point of time 0.00 s. The short circuit between the first connecting line 16 to the earth terminal 20 and the blocking of the converter 11 results in a reduction of the currents between 0.00 s and 0.01 s. The source voltage UQ at the first side 12 of the converter 11 is short circuited and has the value 0 V. The electromagnetic force EMF of the machine 26 is still present. Grid side short-circuit current after UFES firing is not shown in FIG. 6B, as the shown current is measured between UFES 14 and converter 11. However, in this sample case, the currents remain at the value zero after 0.02 s. In this example, the machine 26 is not subjected to any short circuit current. The converter arrangement 10 is in a stable state after the firing of the grid side UFES (machine side UFES 29 is not applied). Advantageously, damage of the machine 26 is avoided.

The currents IN1 to IN3, IL1 to IL3 rise again in FIG. 5A but not in FIG. 6A (the difference results from the effect of the short-circuit switch 14). In FIG. 5A, these currents rise again, because the cells start conduction again by rectification, since the AC voltages applied on the AC terminals are higher than the DC voltages in the phase legs. In FIG. 6A, the currents do not rise again, because the present minimum phase leg voltage is reduced and remains below the DC voltages in the phase legs (resulting from the AC voltage on the grid side now being zero, resulting from the shorting of the input side 12 of the converter 11) and no rectification occurs.

Figure 7B:
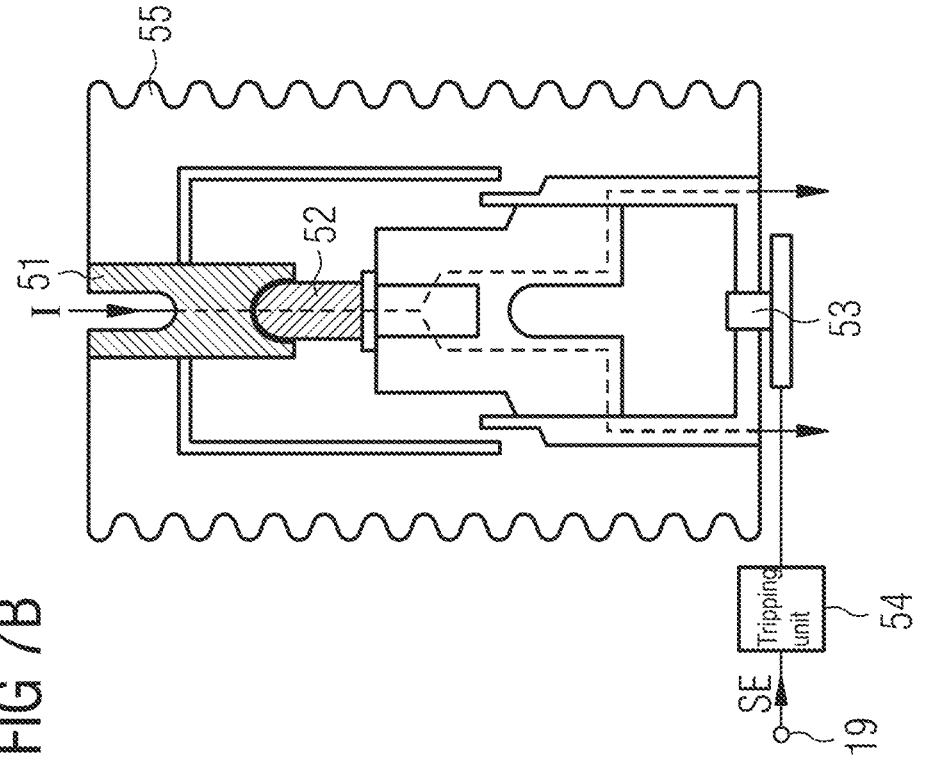
Figure 7A:
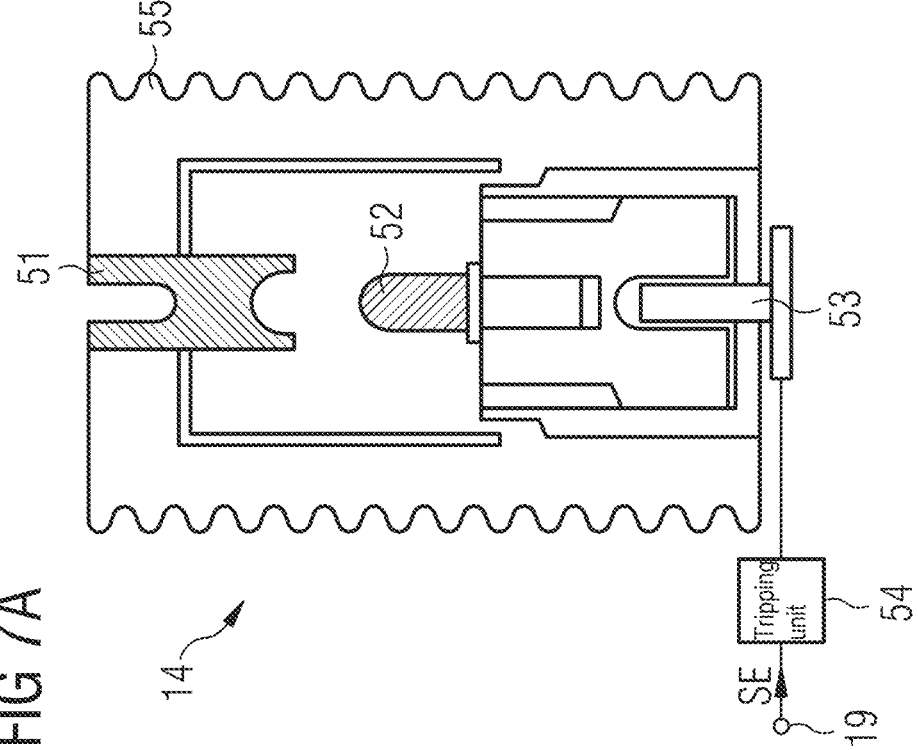

FIG. 7A shows an example of a short-circuit switch 14. The short-circuit switch 14 can be inserted in the embodiments of the converter arrangements 10 shown above. The short-circuit switch 14 can be implemented as an ultra-fast earthing switch. The short-circuit switch 14 comprises a first conductive part 51 and a second conductive part 52 that are free from any contact to each other during a normal state of operation. There is a distance between the first and the second conductive part 51, 52. No current flows during a normal state of operation between the first and the second conductive part 51, 52. The short-circuit switch 14 comprises a micro gas generator 53. The short-circuit switch 14 comprises an electronic tripping unit 54 that is coupled on its input side to the input 19 of the short-circuit switch 14 and on its output side to the micro gas generator 53. The short-circuit switch 14 includes an insulating housing 55.

In case of a fault of the converter, the set signal SE is provided to the tripping unit 54 that causes a gas generation by the micro gas generator 53, similarly to an explosion. As shown in FIG. 7B, by the gas generation the second conductive part 52 is moved towards the first conductive part 51 such that a current I can flow from the first conductive part 51 via the second conductive part 52 to the earth terminal 20 or another connection line.

In an alternative, not shown embodiment, the short-circuit switch 14 is additionally connected to a current sensor (not shown) to detect a current of the first connection line 16. Thus, in case of a current inside the first connection line 16 being over a predetermined limit, the short-circuit switch 14 is set in a conducting state. Thus, the micro gas generator 53 generates gas also in case of a current over the predetermined limit.

Additionally, the short-circuit switch 14 may include an optical detector configured for arc detection. An arc is detected e.g. at the transformer 22 or inside the converter 11. In case the optical detector detects an arc, the tripping unit 54 also triggers the micro gas generator 53.

Figure 8A:
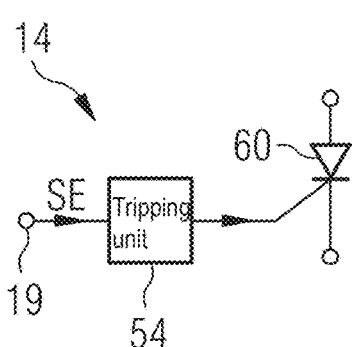

FIG. 8A shows a further exemplary embodiment of a short-circuit switch 14 that can be used in one of the converter arrangements 10 shown above. The short-circuit switch 14 comprises a first thyristor 60. The tripping unit 54 is connected to a gate of the first thyristor 60. In case of a fault of the converter 11, the first thyristor 60 is triggered by the tripping unit 54.

In an alternative, not shown embodiment, the short-circuit switch 14 is realized as a mechanical switch including an electromagnetic or current drive or a spring mechanism.

The auxiliary short-circuit switch 29 and the further and the additional short-circuit switch 41, 42 can be realized in the same manner as one of the short-circuit switches discussed above and/or shown in FIGS. 7A, 7B, 8A and 8C.

Figure 8B:
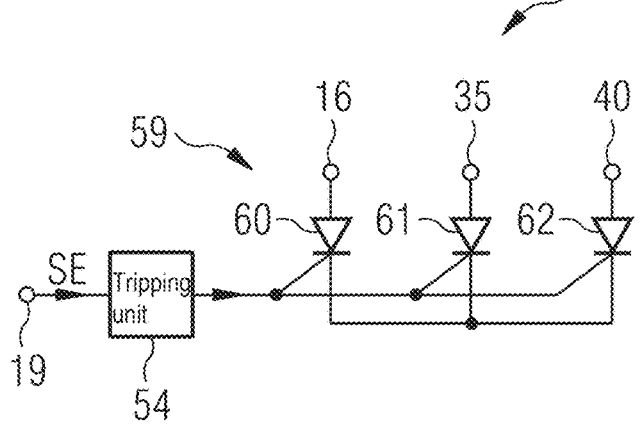

FIG. 8B shows a further exemplary embodiment of a short-circuit switch 14 that can be used in one of the converter arrangements 10 shown above and which is a further development of the embodiment shown in FIG. 8A. The short-circuit switch 14 comprises a crowbar 59. The short-circuit switch 14 also takes over the function of the further and the additional short-circuit switch 41, 42. The tripping unit 54 of the short-circuit switch 14 has an output connected to an input of the crowbar 59. The crowbar 59 comprises the first thyristor 60 and a second and a third thyristor 61, 62. The crowbar 59 connects the first, second and third connection line 16, 35, 40 to each other. The crowbar 59 may include a short-circuit impedance, not shown. The short-circuit impedance can be zero, a resistive impedance or an inductive impedance or a combination of a resistive impedance or an inductive impedance. The crowbar 59 is triggered by the set signal SE in case of a fault of the converter 11. The examples of the short-circuit switch 14 shown in FIGS. 8A and 8B are implemented as unidirectional switch.

In a further development, the crowbar 59 may additionally be connected to the earth terminal 20. Thus, the first, second and third connection line 16, 35, 40 are short circuited to the earth terminal by the crowbar 59 in case of a fault of the converter 11.

Figure 8C:
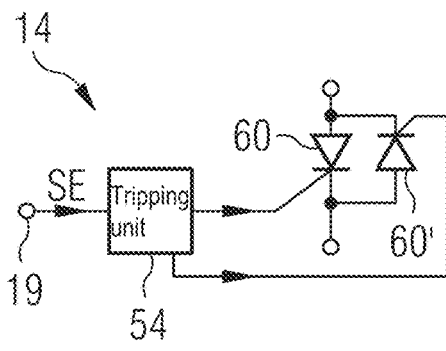

FIG. 8C shows a further exemplary embodiment of a short-circuit switch 14 which is a further development of the embodiments shown in FIGS. 8A and 8B. The short-circuit switch 14 comprises a further first thyristor 60'. The tripping unit 54 is connected to a gate of the further first thyristor 60'. In case of a fault of the converter 11, the further first thyristor 60' is triggered by the tripping unit 54. The first thyristor 60 and the further first thyristor 60' are connected anti-parallel. The short-circuit switch 14 is realized as bidirection switch or bidirectional switch. The short-circuit switch 14 is applicable with AC quantities.

Figure 8D:
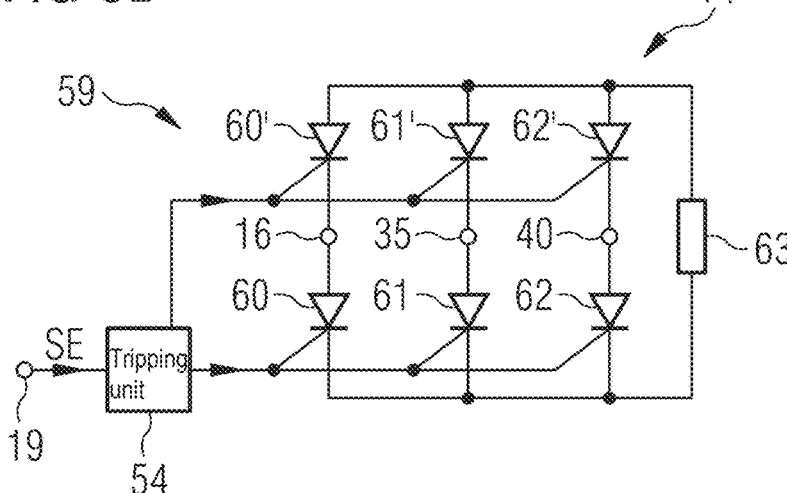

FIG. 8D shows a further exemplary embodiment of a short-circuit switch 14 which is a further development of the embodiments shown in FIGS. 8A to 8C. The crowbar 59 comprises the further first thyristor 60' and a further second and a further third thyristor 61', 62'. The crowbar 59 connects the first, second and third connection line 16, 35, to each other.

The crowbar 59 includes a short-circuit impedance 63. The short-circuit impedance 63 can be zero, a resistive impedance or an inductive impedance or a combination of a resistive impedance or an inductive impedance. In an example, the short-circuit impedance 63 is realized as a resistor, e.g. a braking resistor. The first, second and third connection line 16, 35, 40 are connected via the first, second and third thyristor 60, 61, 62 to a first terminal of the short-circuit impedance 63. The first, second and third connection line 16, 35, 40 are connected via the further first, the further second and the further third thyristor 60', 61', 62' to a second terminal of the short-circuit impedance 63. The short-circuit impedance 63 is arranged between two star nodes of the crowbar 59. The crowbar 59 and thus the short-circuit switch 14 are implemented as a thyristor bridge, e.g. as a three-phase bridge using six thyristors 60 to 62, 60' to 62'. The crowbar 59 and thus the short-circuit switch 14 are applicable with AC quantities.

FIG. 9A shows an example of a converter 11 that can be used in one of the embodiments of the converter arrangements 10 shown above. The converter 11 is implemented as an AC/AC-converter. The converter 11 is configured as a three phase to three phase converter. Thus, the converter 11 has the first, second and third connection line 16, 35, 40 on the first side 12 and the further first, further second and further third connection line 27, 38, 44 at the second side 13 of the converter 11

The converter 11 is realized as a direct AC-to-AC converter. The converter 11 comprises a modular multi-level converter 65, abbreviated MMC. The converter 11 has three phase-legs 66 to 68 coupling the first connection line 16 at the first side 12 of the converter 11 to the further first, further second and further third connection line 27, 38, 44 at the second side 12 of the converter 11. Moreover, the converter 11 comprises a fourth to a sixth phase-leg 69 to 71 coupling the second connection line 35 to the further first, further second and further third connection line 27, 38, 44. Additionally, the converter 11 comprises a seventh to a ninth phase-leg 72 to 74 coupling the third connection line 40 to the further first, further second and further third connection line 27, 38, 44. A phase-leg can be named arm.

Figure 9B:
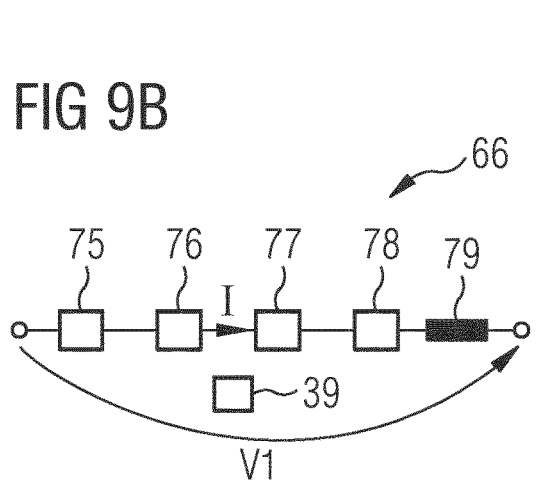

FIG. 9B shows an example of a phase-leg 66 that can be used in one of the embodiments of the converter arrangements 10 shown above. The phase-legs 67 to 74 shown in FIG. 9A can be realized such as the phase-leg 66 of FIG. 9B. The phase-leg 66 comprises a first number of cells 75 to 78. The first number of cells 75 to 78 are series connected. Alternatively, the first number of cells 75 to 78 are arranged in a matrix circuit or a parallel circuit. The phase-leg 66 comprises a phase-leg inductor 79. Each of the phase-legs 66 to 74 comprises several cells 75 to 78 which are implemented e.g. as full bridge cells. A current I flows through the phase-leg 66. The sensor 39 is e.g. a current sensor measuring the current I. A first voltage V1 can be tapped between the outer terminals of the phase-leg 66.

Figure 9C:
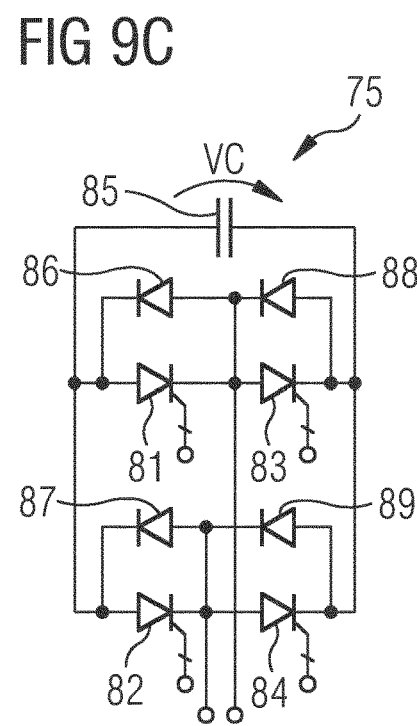

FIG. 9C shows an example of a cell 75 that can be used in one of the embodiments of the converter arrangements 10 shown above. The cell 75 is realized as full bridge cell. In an example, the first number of cells of the phase-leg 66 is realized such as the cell 75. The cell 75 comprises four semiconductor switches 81 to 84. In an example, the semiconductor switches 81 to 84 are realized as thyristors, e.g. as gate turn-off thyristors (abbreviated GTO). The cell 75 comprises four diodes 86 to 89 which are coupled to the four semiconductor switches 81 to 84. The four diodes 86 to 89 operate as freewheeling diodes. The cell 75 includes a storage arrangement 85. The storage arrangement 85 comprises e.g. a capacitor. A cell voltage VC is stored by the storage arrangement 85. Control terminals of the semiconductor switches 81 to 84 are coupled to the controller 15 (as shown in FIG. 1A) or the control unit 30 (as shown in FIGS. 1B and 1C), e.g. via a logic circuit.

In an example, the detection signal ST is determined by measurements of the current I, the first voltage V1 and/or the cell voltage VC by current sensors and/or voltage detectors (not shown). The cell voltage VC is measured and the measuring result is e.g. directly provided to the controller 15. Also, the further cell voltages VC of the further cells 76 to 78 also of the other phase-legs are measured and the measuring results are e.g. directly provided to the controller 15. In an alternative example, the measuring results are provided via the control unit 30 to the controller 15; the measuring results may be preprocessed or evaluated by the control unit 30.

Alternatively, the cell 75 is realized as half-bridge.

The embodiments shown in the FIGS. 1A to 9C as stated represent exemplary embodiments of the improved converter arrangement and method for operating a converter arrangement; therefore, they do not constitute a complete list of all embodiments according to the improved converter arrangement and method for operating a converter arrangement. Actual converter arrangements and methods may vary from the embodiments shown in terms of arrangements, devices, units, switches, circuits and signals for example.

REFERENCE NUMERALS 10 converter arrangement
11 converter
12 first side
13 second side
14 short-circuit switch
15 controller
16 first connection line
17 terminal
18 output
19 control terminal
20 earth terminal 21 grid
22 transformer
23 further output
24 first circuit breaker
25 further output
26 machine
27 further first connection line
29 auxiliary short-circuit switch
30 control unit
31 current sensor
32, 33, 34 connection line
35 second connection line
37 second circuit breaker
38 further second connection line
39 sensor
40 third connection line
41 further short-circuit switch
42 additional short-circuit switch
43 third circuit breaker
44 further third connection line
45 star node
46 star impedance
51 first conductive part
52 second conductive part
53 micro gas generator
54 tripping unit
55 insulating housing
59 crowbar
60 to 62 thyristor
60' to 62' thyristor
63 short-circuit impedance
65 modular multi-level converter
66 to 74 phase-leg
75 to 78 cell
79 phase-leg inductor
81 to 84 semiconductor switch
85 storage arrangement
86 to 89 diode
I current
IS current sensor signal
SC control signals
SE set signal
SE1 further set signal
SE2 additional set signal
ST detection signal
t time

The invention claimed is:

1. A converter arrangement, comprising:
a converter with a first side and a second side,
a first connection line connected to the first side of the converter,
a short-circuit switch connected to the first connection line,
a controller having a terminal coupled to the converter and an output connected to a control terminal of the short-circuit switch,
  a further first connection line connected to the second side of the converter,
  an auxiliary short-circuit switch connected to the further first connection line, and a machine coupled to the second side of the converter via the further first connection line,
wherein the converter is configured to provide a detection signal,
wherein the controller is configured to receive and evaluate the detection signal, and wherein upon detection of a converter internal fault, the controller triggers fast shorting of the first side via the short-circuit switch and blocks converter pulses simultaneously, driving currents to zero and making full converter blocking voltage available on the machine side.

2. The converter arrangement according to claim 1,
wherein the short-circuit switch comprises an ultrafast switch.

3. The converter arrangement according to claim 1,
wherein the short-circuit switch includes a crowbar.

4. The converter arrangement according to claim 1,
wherein the short-circuit switch connects the first connection line to an earth terminal.

5. The converter arrangement according to claim 1,
wherein the converter arrangement includes a second connection line connected to the first side of the converter, and
wherein the short-circuit switch is coupled to the first connection line and to the second connection line.

6. The converter arrangement according to claim 1,
wherein the converter is configured to provide the detection signal, wherein the controller is configured to receive the detection signal at the terminal of the controller and to provide a set signal to the control terminal of the short-circuit switch in case a fault is detected by evaluation of the detection signal, and wherein the short-circuit switch is configured to be set in a conducting state by the set signal.

7. The converter arrangement according to claim 1,
wherein the converter arrangement comprises a first circuit breaker and a transformer,
wherein the first circuit breaker is coupled via the transformer to the first connection line, and
wherein the controller comprises a further output connected to a control terminal of the first circuit breaker.

8. The converter arrangement according to claim 1,
wherein the controller is coupled to the auxiliary short-circuit switch for providing an additional set signal to the auxiliary short-circuit switch.

9. The converter arrangement according to claim 1,
wherein the converter arrangement comprises a current sensor configured to measure a current of the further first connection line, and
wherein an output of the current sensor is connected to an input of the auxiliary short-circuit switch.

10. The converter arrangement according to claim 1,
wherein the converter is implemented as an AC/AC converter and includes a modular multi-level converter.

11. The converter arrangement according to claim 1,
wherein the controller is configured to block the converter pulses within less than 4 milliseconds of detecting the converter internal fault.

12. The converter arrangement according to claim 1,
wherein the converter comprises a modular multi-level converter having phase legs with a voltage blocking capability configured to cover a sum of AC voltages at both the first side and the second side.

13. The converter arrangement according to claim 1,
wherein the controller is configured to:
trigger the short-circuit switch to create a short circuit on the first side, wherein short circuit currents are limited by a transformer short circuit impedance; and
trip a main circuit breaker on the first side.

14. The converter arrangement according to claim 1,
wherein the controller is configured to detect the converter internal fault by:
analyzing internal voltages and currents of the converter;

combining different signals representing the internal voltages and currents; and generating a set signal to trigger the short-circuit switch based on the analyzing and combining.

15. The converter arrangement according to claim 1, wherein the controller is configured to:

detect the converter internal fault by evaluating a maximum available phase-leg voltage compared to a present voltage across a phase-leg of the converter; and trigger the short-circuit switch when the maximum available phase-leg voltage is less than the present voltage across the phase-leg.

16. A method for operating a converter arrangement, comprising providing a converter with a first side and a second side, providing a detection signal by the converter, receiving the detection signal by a controller, providing a set signal to a short-circuit switch by the controller in case the controller determines a fault of the converter by evaluating the detection signal, and setting the short-circuit switch in a conducting state by the set signal, wherein the converter arrangement comprises a further first connection line connected to the second side of the converter, an auxiliary short-circuit switch connected to the further first connection line, and a machine coupled to the second side of the converter via the further first connection line, wherein upon detection of a converter internal fault, the controller triggers fast shorting of the first side via the short-circuit switch and blocks converter pulses simultaneously, driving currents to zero and making full converter blocking voltage available on the machine side.

17. The method according to claim 16, wherein the detection signal includes at least one information of a group comprising:

a measurement of a DC voltage of the converter, a measurement of an AC voltage of the converter, a measurement of a current of the converter, a measurement of a present voltage across a phase-leg of the converter, an information of a status of a cell of the converter, an information of a status of a phase-leg of the converter, and an information of a detected light generated by an arc.

18. The method according to claim 16, wherein the controller determines the fault of the converter by performing at least one evaluation of a group comprising:

comparing a DC voltage of the converter with an AC voltage of the converter, comparing a maximum available phase-leg voltage with a present voltage across a phase-leg of the converter, comparing a current of the converter with a predetermined value, comparing a number of cells of the converter with a status indicating a short-circuit with a predetermined number, determining a presence of a phase-leg of the converter with a status indicating out-of-order, and determining a presence of an arc.

19. The method according to claim 16, wherein upon detection of a sustained machine side short circuit after the fast shorting of the first side, the controller is configured to trigger the auxiliary short-circuit switch after a delay.

* * * * *